No. 805,455. PATENTED NOV. 28, 1905.
J. J. DORMAN.
STALK CUTTER.
APPLICATION FILED MAY 13, 1905.
2 SHEETS—SHEET 2.
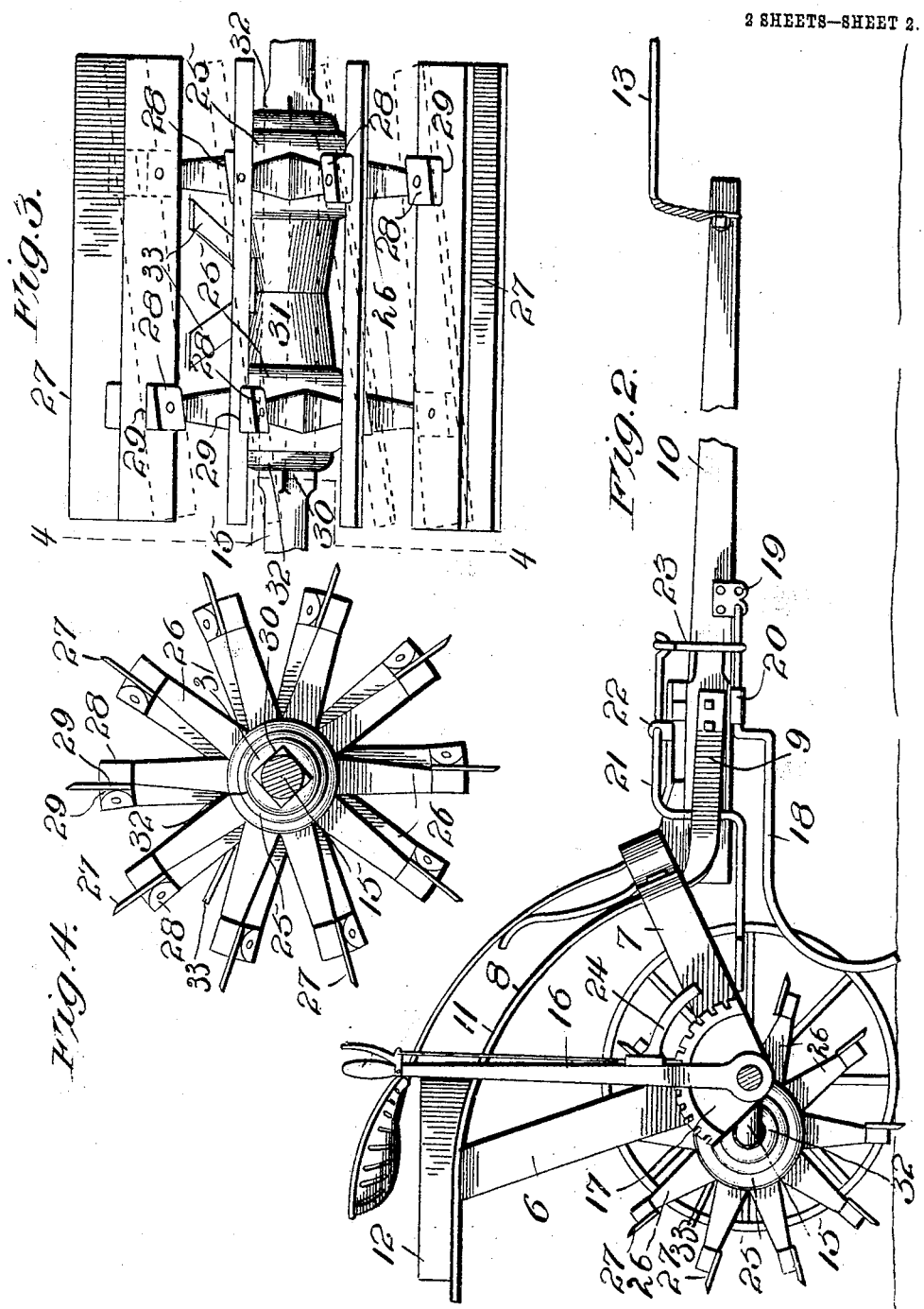
WITNESSES:
H. F. Doyle.
Geo. E. Tew
INVENTOR
John J. Dorman,
BY Milo B. Stevens & Co.
Attorneys.

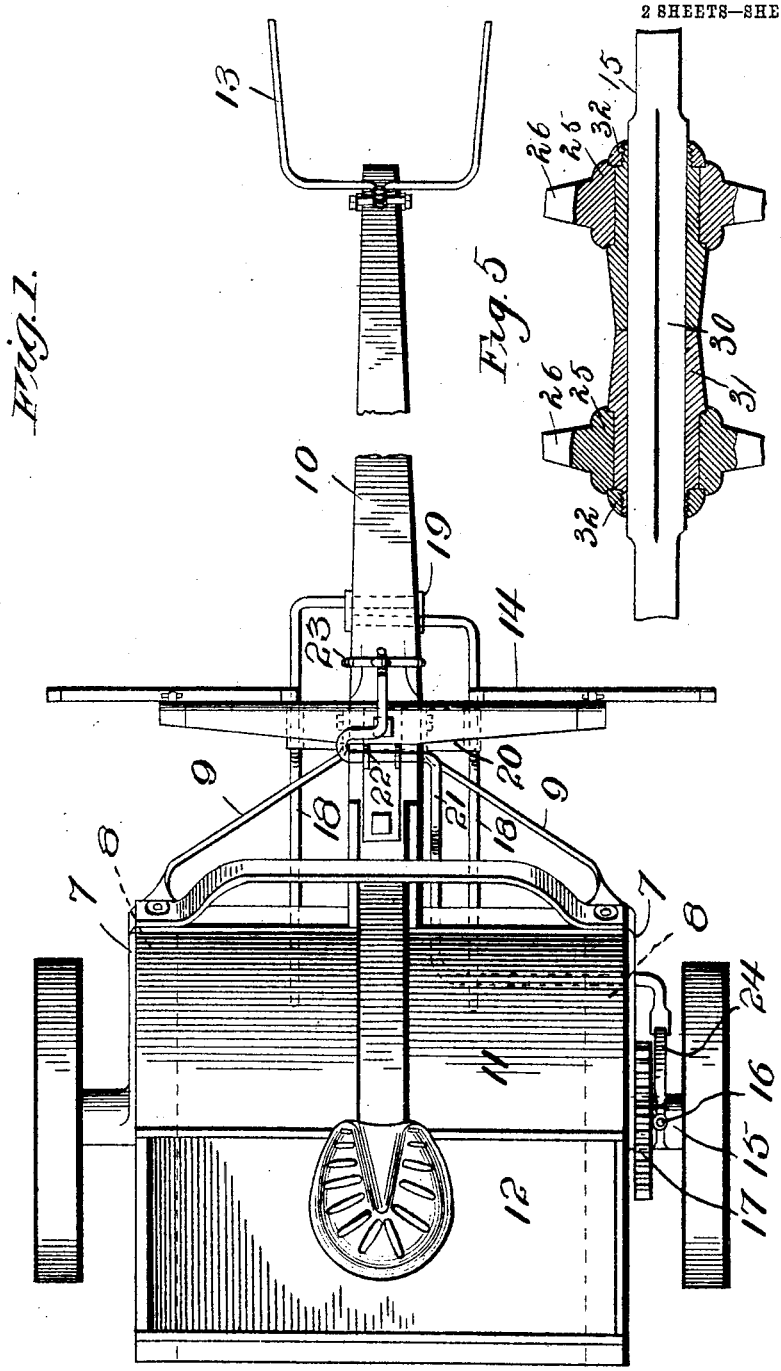

UNITED STATES PATENT OFFICE.

JOHN JAMES DORMAN, OF MAXTON, NORTH CAROLINA.

STALK-CUTTER.

No. 805,455.        Specification of Letters Patent.        Patented Nov. 28, 1905.

Application filed May 13, 1905. Serial No. 260,268.

*To all whom it may concern:*

Be it known that I, JOHN JAMES DORMAN, a citizen of the United States, residing at Maxton, in the county of Robeson and State of North Carolina, have invented new and useful Improvements in Stalk-Cutters, of which the following is a specification.

This invention relates to that class of machines used to cut off the stalks of corn, cotton, or other plants, especially preparatory to plowing. The machine has a rotary frame provided with cutters which may be raised or lowered from the ground and is characterized by improvement of construction and advantages of operation, as will be more fully apparent from the following description and the drawings.

In the drawings, Figure 1 is a plan view of the machine. Fig. 2 is a side elevation with the near wheel removed. Fig. 3 is a detail in rear elevation of the rotary cutter. Fig. 4 is a cross-section on the line 4 4 of Fig. 3. Fig. 5 is a section of the head of the cutter lengthwise of the axle.

Referring specifically to the drawings, the main frame of the machine consists of arches 6 and 7, connected by curved bars 8, which are continued forwardly and bent to form braces or hounds 9 for the tongue 10, to which they are connected. The rear end of the tongue is joined to the front arch 7. The curved bars 8 support a shield 11, preferably formed of sheet metal, which extends over the cutting devices and has thereon a stone-box 12, into which stones may be piled to weight the machine, as desired. At the front end of the tongue is a device designed to prevent large and heavy stalks, such as cornstalks, from interfering with the team. This device comprises a fork 13, secured to and projecting forwardly from the front end of the tongue, and the branches of the fork are spread laterally to gather and bend down the stalks. In the operation of the machine it is driven along the row with a horse on each side of the row. This fork, as shown, projects in advance of the horses and by gathering and bending down the stalks gives a clear way for the team and is particularly useful in heavy growth or close rows.

The tongue has whiffletrees 14 of the usual construction.

The rotary cutter is carried upon a cranked axle 15, upon which the main frame is supported, and the axle may be turned to raise or lower the cutter by means of a lever 16, secured to the axle and having a latch engaging a notched segment 17 on the frame.

For the purpose of straightening lodged stalks a pair of hooks 18 are employed. These are hung from a hanger 19 on the under side of the tongue and are normally pressed down by a spring 20, extending across between the hooks and under the tongue. The spring prevents the hooks from jumping and keeps them to their work close to the ground.

21 indicates a lever which is pivoted at 22 to a bracket on top of the tongue and is connected at its front end by a yoked link 23 to the hooks. The rear end of this lever is bent downwardly and laterally to a position in line with an arm 24, which projects from the lever 16. When the lever is thrown forwardly to raise the cutter and lower the frame of the machine, the front end of the arm 24 strikes the rear end of the lever 21 and forces said end down, which has the effect of raising the front end of the lever 21 and lifting the hooks from the ground. This is desirable when the frame is lowered to let the machine run on its wheels when the cutter is out of action, as in traveling along the road. As described, the action of raising the cutter and lowering the frame also lifts the hooks from the ground.

The cutter proper comprises two frames or spiders, each of which consists of a hub 25 and radial arms 26. These spiders are spaced apart and at the ends of their arms carry the knives 27. The knives may be arranged either straight across, parallel to the axis, or at an angle thereto. To effect this result, the ends of the arms are inclined on one side, as indicated at 28, and straight on the other side, as indicated at 29, forming two faces, to either of which the knives may be bolted. When the knives are bolted to the straight faces, as shown in full lines in Fig. 3, they extend straight across. This is desirable in cutting cotton-stalks. When the knives are bolted to the inclined faces of the arms, as indicated in dotted lines in Fig. 3, they extend at an angle, which is advantageous in cutting corn and other heavy stalks.

The manner of mounting the spiders on the main axle is novel and will be described. At the middle, where the cutter is located, the axle is squared, as indicated at 30, Fig. 4, and upon this squared portion is placed a split sleeve 31, held at the ends by two collars 32, screwed thereon. The hubs of the spiders turn on this sleeve, and the eye thereof is sufficiently large that they may pass over the elbows in the axle and be removed therefrom by removing the wheels and taking the axle out of the frame.

A defect in rotary stalk-cutters is that vines or stalks often become entangled with the knives and wind around the axle in such a manner as to be difficult of removal, with the result that the machine has to be stopped often and the vines cut off by hand. To remedy this, I provide a fork 33, secured to the sleeve 31 and projecting outwardly therefrom between or inside the knives. Any vines or trash lifted by the knives or the arms holding the same will come in contact with this fork and will be thereby prevented from winding around the axle.

What I claim as new, and desire to secure by Letters Patent, is—

1. A rotary cutter comprising spiders having arms the ends of which have opposite sides at an angle to each other, and blades attachable to either of said sides, to vary the angle with respect to the axis of the cutter.

2. In a stalk-cutter, the combination with a cranked axle, of a split bearing-sleeve thereon, and a rotary cutter having hubs mounted to turn upon said sleeve.

3. A stalk-cutter having a rotary cutter mounted upon an axle, and a projecting member mounted upon the axle within or between the blades of the cutter and arranged to prevent vines or the like winding upon the axle.

In testimony whereof I have signed my name to this specification in the presence of two subscribing witnesses.

JOHN JAMES DORMAN.

Witnesses:
J. O'DANIEL,
JAS. S. McQUEEN.